Dec. 20, 1960 J. H. GREIG 2,965,867

PHOTOSENSITIVE ELEMENT

Filed Jan. 2, 1959

*INVENTOR.*
JOHN H. GREIG

*BY* J. B. Burke

ATTORNEY

United States Patent Office 2,965,867

Patented Dec. 20, 1960

2,965,867

PHOTOSENSITIVE ELEMENT

John H. Greig, New York, N.Y., assignor to Clairex Corporation, a corporation of New York Filed Jan. 2, 1959, Ser. No. 784,558

13 Claims. (Cl. 338—15)

This invention concerns an improvement in photoconductive cells in which a change in electrical resistance occurs as a result of a change in illumination thereof.

It is one object of the invention to provide a photocell having a predetermined temperature-response characteristic, i.e., relative activity or activity with respect to temperature over a predetermined temperature range. By "activity" or "sensitivity" is meant the magnitude of change in electrical resistance of the photoconductive element.

It is a further object to provide a photocell having a predetermined spectral-response characteristic, with the characteristic being independent of the activity of the photocell.

Another object is to provide a novel method for manufacturing a photosensitive element having any of the aforementioned predetermined properties.

Another object is to provide a photosensitive element having the above mentioned predetermined properties, the element being a solid body containing two or more cadmium salts diffused into each other, the solid diffusion being in monocrystalline or polycrystalline form.

A further object is to provide a photoconductive element in the form of a solid mutual diffusion in a dry state, the diffusion consisting of any two or all three of the cadmium salts; cadmium sulphide, cadmium selenide, and cadmium telluride.

Another object is to provide a photosensitive element having crystalline constituents mutually diffused therein either homogeneously or with a diffusion gradient between one portion and another.

Another object is to provide a method of manufacturing a photosensitive element with predetermined spectral-response and temperature-response characteristics.

Other and further objects and advantages of the invention will become apparent from the following description taken together with the drawing, wherein.

Figures 1, 2, 3, 4, 5, 6, 7, 8, 9, 10, 11, 12, 13:
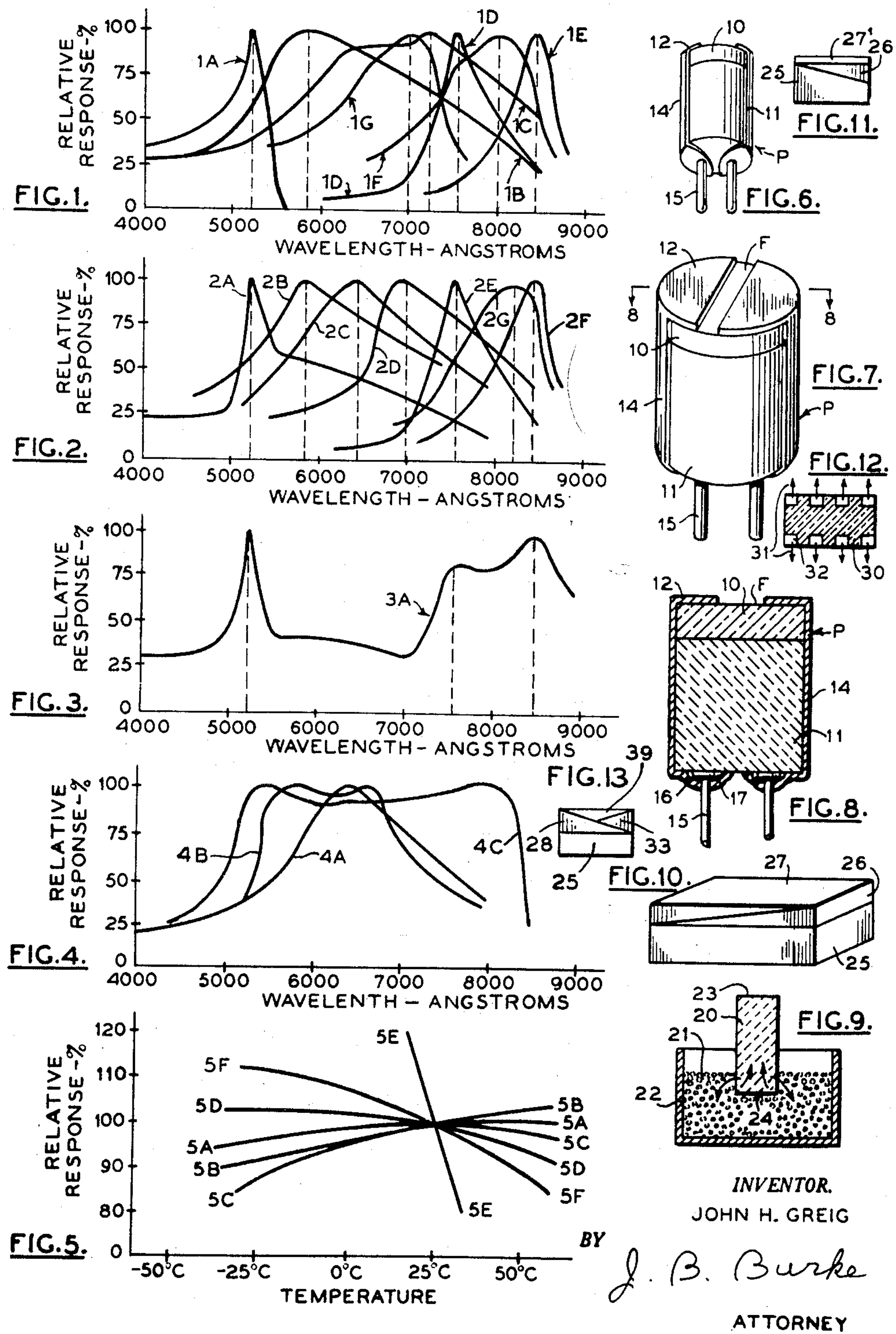
Figs. 1–5 are charts useful in explaining the invention.
Figs. 6 and 7 are oblique elevational views of a photocell embodying the invention.
Fig. 8 is a sectional view taken on lines 8—8 of Fig. 7.
Fig. 9 is a perspective view of a photosensitive element in one step of formation thereof.
Fig. 10 is an end elevational view of another photoconductive element in a step of manufacture thereof.
Figs. 11 and 13 are end elevational views of other photosensitive elements each in a step of formation thereof.
Fig. 12 is a top plan view of another photosensitive element.

Photocells employing photosensitive elements of cadmium sulphide, cadmium selenide, cadmium telluride and other crystalline materials have been known heretofore. The spectral response and variation of activity with temperature of the prior known photosensitive elements has generally been predeterminable and controllable in the manufacture of the elements to a very limited extent. The present invention provides a method and means for predetermining essential properties of certain photosensitive elements.

I have discovered according to the invention that it is possible to make a solid diffusion of cadmium salts as a single crystal or as a polycrystalline mass, each crystal of which mass is a dry diffusion production a solid state of two or more cadmium salts such as cadmium sulphide, cadmium selenide, cadmium telluride, and possibly other cadmium salts. The diffusion is effected by heating one or more crystals of one cadmium salt in contact with one or more crystals of one or more other cadmium salts in a dry solid state. The resulting photosensitive element has photoconductive properties and characteristics which will be described in connection with Figs. 1–5.

Referring to Figs. 6, 7 and 8 there is shown a photocell P containing a photosensitive element in the form of a crystalline disk 10 mounted on a cylindrical support or base 11. The base is preferably formed from some refractory material such as porcelain or other ceramic. A pair of spaced electrodes 12 overlay opposite ends of the crystal element 10 and extend as strips 14 down the sides of the base to the underside where they make electrical contact with the conductive pins or wires 15. The pins may be attached to the ceramic base by suitable adhesive layers 16 engaged with the heads 17 of the pins. The electrodes may be applied as conductive paint as described in Patent 2,839,645. The upper face F of the crystal element is exposed between the electrodes 12 to illuminating rays of light to which the crystal element is sensitive.

In each of Figs. 1–5 characteristic curves are illustrated for various photocells P each of which contains a photoconductive element 10 as shown in Figs. 6–8. The composition of the element 10 is different for each of the several photocells as will be explained. In Figs. 1–4 are plotted the relative electrical responses of various photocells over a spectral range. To obtain the curves shown in the drawing each photocell tested was illuminated by a series of light beams of different wave lengths and constant incident radiant power while a constant voltage (100 volts D.C.) was applied to terminals 15, and the resulting D.C. currents passing through the photocells were measured. The maximum current reading for each group of photocells tested was designated as "100% relative response." All other readings were recorded as percentage responses with respect to the maximum electrical response.

In Fig. 1, curve 1A illustrates graphically the spectral-response characteristic of a photocell P where the photosensitive element 10 was a single crystal of cadmium sulphide. It will be noted that the crystal responded best to rays in the green and green-blue band having wave lengths less than approximately 5500 angstroms. Curve 1D in Fig. 1 illustrates the spectral-response characteristic of a photocell where the photosensitive element 10 was a single crystal of cadmium selenide. It will be noted that the crystal responded best to rays in the orange and red band with a narrow peak occurring at about 7500 angstroms. Curve 1B shows the spectral-response of another photocell P where the element 10 was a crystal consisting of a solid diffusion in a dry state of cadmium sulphide and cadmium selenide. This diffusion was obtained as described below under conditions wherein the element was heated during processing for about an hour at a temperature of approximately 500° C. It will be noted that the spectral-response peak exists at about 6000 angstroms and is broadened over the narrow peak indicated for curves 1A and 1D.

Curve 1C represents the spectral-response of another photocell P where the element 10 consisted of a solid diffusion of cadmium sulphide and cadmium selenide which had been preheated at about 500° C. for about twenty hours. The shifting of the spectral response peak toward the red end of the spectrum and the further broadening of the peak are clearly evident.

Curve 1E is the spectral-response characteristic of a photocell having a single crystal of cadmium telluride as the photosensitive element. The peak response is located close to 9000 angstroms. Curve 1F shows the spectral-response characteristic of another photocell where the photosensitive element consisted of a solid diffusion in a dry state of cadmium selenide and cadmium telluride. The peak response is shown located at about 8200 angstroms between the peak responses of cadmium selenide and cadmium telluride alone, and the peak is considerably broadened. Curve 1G is the spectral-response characteristic of a photocell consisting of a solid diffusion in a dry state of cadmium sulphide and cadmium telluride. The peak response is at about 7000 angstroms and is again broadened. The shifting of the peak responses toward the red position of the visible spectrum and the broadening of the peak responses produced by diffusing cadmium telluride with cadmium sulphide and with cadmium selenide are clearly illustrated by curves 1G and 1F respectively. Curves 1F and 1G were obtained by testing solid diffusions obtained by heating cadmium telluride in contact with cadmium selenide and cadmium sulphide respectively, in a dry state for about one hour at approximately 500° C. It is also possible to obtain photocells having the same spectral-responses as shown in curves 1B, 1C, 1F and 1G by varying the relative content of the cadmium salts in the crystal rather than prolonging the time of heat treatment as will be explained in connection with Fig. 2.

Curve 2A of Fig. 2 illustrates the spectral-response of a photocell P employing an element 10 formed of polycrystalline cadmium sulphide. The response peak occurs at about 5200 angstroms which is substantially the same wave length as for the single cadmium sulphide crystal illustrated by curve 1A. Curves 2E and 2F of Fig. 2 are the same as curves 1D and 1E of Fig. 1 and represent the response of cadmium selenide and cadmium telluride crystals which normally have peaks at about 7500 and 9000 angstroms. Curves 2B, 2C and 2D are spectral-response curves of photocells P having elements 10 formed of cadmium sulphide-selenide diffusions, where the cadmium selenide content of the elements is respectively 25%, 50%, and 75% by weight of each element. Curve 2G is the spectral response curve of a photocell P having an element 10 formed of a cadmium selenide-cadmium telluride diffusion, where the content by weight of the element was 25% cadmium selenide and 75% cadmium telluride. The curves 2B–2D and 2G of Fig. 2 illustrate that it is possible to predetermine the location of the spectral-response peak of the crystal element depending on the relative cadmium salt content. The greater the percentage content of cadmium selenide or cadmium telluride the more the spectral-response peak is shifted toward the red portion of the spectrum. The shifting of the relative response peak from 5200 to 7500 angstroms varies almost linearly with the percentage increase in cadmium selenide content. Adding cadmium telluride shifts the response peak further toward the red portion of the spectrum.

In Fig. 3, curve 3A represents the spectral-response curve of a photocell P in which the element 10 was composed of a mixture of granular crystals of cadmium sulphide, cadmium selenide, and cadmium telluride. The several crystals were simply mixed together at ordinary ambient temperatures. Each granule in the element 10 retained its original identity as a pure crystal of either cadmium sulphide, or cadmium selenide or cadmium telluride without any diffusion having taken place between the several crystals. The characteristic peak responses at about 5200 and 7500 angstroms attributable to the cadmium sulphide and cadmium selenide constituents respectively of the mixture are apparent in curve 3A. This curve may be contrasted with curves 2B–2D in Fig. 2 where the crystal elements were solid diffusions of cadmium sulphide and cadmium selenide rather than being simple mixtures of the two substances.

It has been found possible to prepare solid diffusions of cadmium salts in such a way that the photosensitive element has a higher content cadmium sulphide, for example, at one end and a lower cadmium sulphide content at the other end. The element thus has a diffusion gradient. In any transverse plane through the element the cadmium sulphide and other cadmium salt or salts are uniformly diffused. It is the relative content of the two substances in the successive planes taken in a direction perpendicular to the uniformly diffused planes which varies. This diffusion gradient can be produced in an element from end to end thereof, from side to side, or from top to bottom, depending on the shape of the photosensitive body. Photosensitive elements according to the invention having diffusion gradient structures exhibit spectral-responses which differ from wholly homogeneous solid diffusions having the said relative percentage of each constituent. Referring now to Fig. 4, curve 4A represents a photosensitive element having a broadened spectral-response peak if the crystal body has a greater fractional content of cadmium selenide at one portion and a lesser content of cadmium selenide at another portion thereof so diffused with the cadmium sulphide that the diffusion gradient varied uniformly between the several portions. Thus curve 4A is the spectral-response curve of a photocell having an element in which 50% was cadmium sulphide and 50% was cadmium selenide. The crystal constituents were completely diffused through each other. A rather sharp peak was obtained at about 6300 angstroms. Curve 4B represents the response of another photocell in which the photosensitive element also contained 50% cadmium sulphide and 50% cadmium selenide, but the crystal had a diffusion gradient varying uniformly from substantially 0% cadmium selenide and 100% cadmium sulphide at one end to substantially 100% cadmium selenide and 0% cadmium sulphide at the other end. In gross, the crystal contained 50% of each constituent respectively. The spectral-response of this element is illustrated by curve 4B to have a peak extending from about 5500 to 6700 angstroms.

Curve 4C represents the response of still another photocell in which the photosensitive element contained 50% cadmium sulphide and 50% cadmium telluride, but the crystal had a diffusion gradient varying uniformly from substantially 0% cadmium telluride and 100% cadmium sulphide at one end to substantially 100% cadmium telluride and 0% cadmium sulphide at the other end. In gross, the crystal contained 50% of each constituent respectively. The spectral response of this element is illustrated by curve 4C to have a peak extending from about 5200 to 8400 angstroms.

The curves of Figs. 1–4 illustrate that the spectral-response peak can be located where desired by varying either the time of heat treating the combination of cadmium salts or by varying the relative percentages of cadmium salts contained in the photosensitive element. The curves further show that diffusing the constituents so that the diffusion gradient varies in the crystal results in a spectral-response having a broadened peak. The curves further show that the relative peak response is not affected by varying the time of heat treatment, relative concentrations of the constituents, and diffusion gradient. It has further been found that the activity of the photosensitive crystals remained unaffected by changes in heat treatment time, percentage concentration of constituents and diffusion gradient changes. It was also found that the same spectral-response curves were obtained for each of the photosensitive elements tested when the constant applied voltages were varied between two and 200 volts D.C. and when the inclined illumination applied was varied over a wide range. This means that it is possible according to the invention to form a photosensitive element having a predetermined specified spectral-response without adversely affecting the activity of the element throughout the applicable spectral range. Both the location of the spectral peak in the applicable spectral range and the breadth of the spectral peak in the spectral range can thus be specified and controlled, independent of the magnitude of illumination and voltage applied to the elements.

Fig. 5 illustrates the temperature characteristics of various photocells having photosensitive elements each containing different proportions of cadmium salts. The curves were obtained in a manner similar to the curves of Figs. 1–4 except that the temperature of each photocell tested was varied while a steady white light illuminated each crystal. A constant D.C. voltage was applied to each photocell and the current passing through the photosensitive element was measured. Curves 5A–5E show relative electrical responses of photosensitive elements which were solid diffusions containing respectively substantially 25%, 50%, 75% and 100% of cadmium selenide while the remainder of the homogeneous crystal was cadmium sulphide. The electrical response of the several crystal elements at 25% was arbitrarily designated as 100% in plotting each of the curves. It will be noted that the substantially pure cadmium selenide crystal had a temperature characteristic 5E which is nowhere level or flat. The substantially pure cadmium sulphide crystal had a temperature characteristic 5A which was non-linear although in the range from 25° C. to 60° C. the relative response was rather constant. Curve 5F shows the electrical response characteristic of a crystal element consisting of a solid diffusion of one-third cadmium sulphide, one-third cadmium selenide and one-third cadmium telluride. It will be noted that a more rapidly changing relative response with respect to temperature change was obtained by addition of the cadmium telluride to the crystalline diffusion product.

Curves 5B, 5C and 5D show that it is possible to modify the temperature-response characteristic of a crystal by mutually diffusing different relative amounts of cadmium salts so that a photosensitive element with a prescribed temperature-response characteristic can be produced. Heretofore such a control means for predetermining and specifying the desired temperature-response characteristic of a photosensitive element has been unknown in the art.

A photosensitive element in the form of a solid diffusion according to the invention may be formed as described in the following examples.

*Example I*

(1) Very finely ground powders of crystalline cadmium selenide and cadmium sulphide are mixed together thoroughly at room temperature in desired proportions of each constituent. A suitable size for the particles may range from one-half to two minute grit. This designation indicates the size of particles which remain suspended in a body of water in a container for the prescribed period of time after the particles are deposited therein.

(2) The uniformly mixed particles are then heated in a suitable container in an oven at a temperature ranging from 400° C. to 900° C. for a time ranging from at least one-half hour to about twenty hours. The time required for heating in order to obtain a homogeneous crystalline diffusion will depend on the temperature of heating. Lower temperatures require longer heating, higher temperatures require less heating. Temperatures lower than 400° C. require heating times exceeding twenty hours. Temperatures in excess of 900° C. produce evaporation or sublimation of the crystalline material. At the end of the required heating time the yellow particles of cadmium sulphide and the black particles of cadmium selenide will have diffused into each other homogeneously to produce uniformly colored granular crystals. The resulting color will depend on the relative proportions of each constituent in the original mixture. Sometimes the individual crystal diffusions will tend to agglomerate to form polycrystalline masses or clumps. If desired, these masses may be ground or pulverized at this point in the process to granular form.

(3) The granular diffused crystals are then mixed with water, alcohol, toluene or other volatile fluid to form a slurry containing about 1% of solids to 99% liquid.

(4) The slurry is then poured, painted, or otherwise coated on a surface of a refractory support with the granular crystals still in suspension. The granules are allowed to settle on the support uniformly. The excess liquid is allowed to drain off and the granules are allowed to dry in air at room temperature.

(5) The coated support may then be heated in an oven at a temperature ranging from 400° C. to 900° C. for a period ranging from one-half to twenty hours. This second heating of crystalline diffusions causes the coating to harden into a polycrystalline mass or layer. The final heating may be performed with or without the addition of activators in the form of impurities such as metallic copper, silver, gold, etc. For some photosensitive elements the use of activators may be desired to increase the activity of the elements.

(6) The heated coated support is then allowed to cool to ambient room temperature.

*Example II*

(1) Fine powders of cadmium sulphide and cadmium selenide crystals are thoroughly and uniformly mixed dry in the desired proportions. The two powders should have substantially the same degree of fineness to assure uniformity in the mixture.

(2) A slurry is formed in water or other volatile fluid of the mixed powders.

(3) The slurry is deposited on a refractory support. Excess liquid is allowed to drain off and the settled layer is dried in air at room temperature or by moderately warming.

(4) The support with settled mixture thereon is then heated at a temperature ranging from about 400° C. to 900° C. for a time ranging from at least one-half hour to about twenty hours. During this heating the several crystalline constituents will diffuse into each other to form a homogeneous crystalline diffusion having a uniform color throughout. If desired this heating step can be performed with a suitable activator in contact with the settled mixture.

(5) The support with photosensitive layer is allowed to cool at ambient room temperature. The support with photosensitive layer thereon obtained by either of the processes of Example I or II can then be used to fabricate a photocell as shown in Figs. 6–8 by addition of electrodes 12 and terminal conductors 15.

Since the support 11 for the photosensitive element 10 must be able to withstand the prolonged heat treatment of the sensitive layer 10 and must also serve as a support for the element in the final photocell, this support should be formed preferably of a refractory material having a light reflective surface to which the photosensitive element can adhere. The support can be made of porcelain or other ceramic, glass and the like.

The second heating of the support and sensitive diffusion layer performed in Example I serves principally to increase the mechanical strength of the sensitive layer. If desired this step may be omitted as in Example I. It is preferred that the photocell produced by either of the processes of Example I or II be protected in use by coating or covering the exposed surfaces of the element 10 with a suitable transparent lacquer, resin, plastic, etc.

The methods of Examples I and II can be performed with crystals of cadmium telluride substituted for the crystals of cadmium sulphide or cadmium selenide, or the crystals of cadmium telluride can be used in addition to the crystals of cadmium sulphide and cadmium selenide as described in the examples.

It has been observed that the prolonged heating of a crystal of a cadmium salt in contact with a crystal of another cadmium salt in a dry state at elevated temperatures ranging up to 900° C. results in a crystal in which the two components are completely diffused into each other. The phenomenon may be observed by supporting a crystal 20 of cadmium sulphide, cadmium selenide, or cadmium telluride, in a mass of granule 21 of one or both of the other salts as shown in Fig. 9. The granules are supported in a container 22. If the container is placed in an oven and heated at an elevated temperature it will be observed that the portion of a crystal resting in the bed of granules begins to change color first. Gradually the color will change for the entire crystal 20. If heating is stopped just when the upper surface 23 of the crystal begins to change color, it will be found that the element 20 will have a gradually increasing depth of color from top or end 23 to bottom 24. This color variation indicates that a diffusion gradient exists from end to end or side to side of the crystal. During the diffusion process, the granules surrounding the crystal also change color to indicate a diffusion of one substance into the other has taken place there also.

Another way of obtaining a photosensitive element having a diffusion gradient is illustrated in Fig. 10 and is described in the following example.

*Example III*

(1) A slurry is formed in water of powdered cadmium selenide crystals. The slurry is deposited on a support such as slab 25. Excess water is drained off and the powder is allowed to settle. The settled granules are molded to form a wedge-shaped layer 26 which is allowed to dry.

(2) Another slurry is formed in water of powdered cadmium sulphide crystals. This slurry is deposited on the dried layer 26. The water is drained off and the deposited powder is shaped to form an oppositely inclined wedge layer 27 on layer 26. After the layer 27 has dried, the laminated assembly shown in Fig. 10 is heated for about one hour at 500° C. At the end of this time the two layers 26 and 27 will have diffused into each other. At each end of the solid diffusion, 26, 27, the color of the photosensitive element will be substantially the same as its original color, i.e., yellow for CdS and black for CdSe. At the center of the diffusion the composition will contain 50% of each of CdS and CdSe with quantities of each constituent varying progressively to 0% and 100% for the several constituents.

The type of diffusion formed by the method of Example III is a 50%–50% composition and its spectral-response characteristic is illustrated by curve 4B as having a broadened response peak. Powdered cadmium telluride may be substituted for cadmium selenide or cadmium sulphide in forming layer 26 or 27 in Example III.

In general it is preferable that the cadmium sulphide layer be uppermost in the photosensitive elements formed by the methods described in connection with Example III and Figs. 10, 11. CdS is more sensitive to green light and rather transparent to red light which passes through to the cadmium selenide or cadmium telluride layer beneath. This results in a rather broadly peaked spectral-response curve. If the layers are inverted with the CdSe or CdTe uppermost, a lower green response and narrower peak is obtained because CdSe and CdTe are less transparent to the green light to which CdS responds best.

If a different diffusion gradient is desired in order to obtain a photosensitive element having a narrower response peak, the procedure of Example III can be performed but this time the layer of cadmium sulphide granules can be deposited as a thin flat layer 27 on layer 26 as indicated in Fig. 11. To obtain a broad response peak, the photosensitive element can be formed as shown in Fig. 13 with a wedge-shaped layer 28 consisting of cadmium telluride on base 25. A wedge 33 of cadmium sulphide is on the narrower end of wedge 28 and layer 29 of cadmium selenide is deposited as an inverted pyramid on both layers 28 and 33.

It is possible to form both layers 26 and 27 as flat rather than wedge-shaped deposits on support 11. If heating is then done the contacting boundary surfaces will first fuse and change color and gradually the diffusion will spread up and down from the boundary layers. If heating is stopped after a limited time the photosensitive element obtained has a clearly observable diffusion gradient. The diffusion has been observed to take place between two individuals of different cadmium salts, between a single crystal of one cadmium salt and a polycrystalline mass of one or more other cadmium salts, and between two polycrystalline masses of different cadmium salts.

If desired a polycrystalline diffusion of different cadmium salts can be ground up and mixed with a suitable transparent liquid binder. The mixture can then be painted on a suitable support. When the liquid has dried the coating on the support will have characteristics similar to those as described for the solid diffusion shown in Figs. 6–8.

In addition to providing a means for making a photocell having a prescribed spectral-response characteristic with broadened response peak (predetermined as to response and spectral range) the photosensitive element having a diffusion gradient has further utility. A further use for a photosensitive element having a diffusion gradient is shown in Fig. 12. The rectangular element 30 has a diffusion gradient varying uniformly from end to end thereof. A plurality of pairs of electrodes 32 are disposed along the element. Terminals 31 are connected to the several electrodes. This element has an electrical response to incident light of any particular wave length, which response varies for each pair of electrodes. If each pair of electrodes is arranged in a separate electric circuit, then the circuits can be selectively controlled by illuminating the element with light of any particular wave length to which a particular portion of element 30 is most responsive. The current passing through the electrodes at that portion of the elements will then be most affected by the incident light.

Considerable study has been given to the nature of the mutual diffusion phenomenon discovered in cadmium salt crystals. Attempts have been made to cause diffusion of cadmium sulphide, cadmium telluride, and cadmium selenide crystals with cadmium oxide without success. It has been observed that cadmium sulphide, cadmium selenide and cadmium telluride crystals have crystal lattice structures which appear to be identical except for the spacing between atoms of the several crystals. During diffusion in a dry state it is believed that a new crystal lattice is formed having a basically hexagonal form with interatomic spacings characteristic of cadmium sulphide, cadmium selenide, and cadmium telluride. The diffusion is believed molecular, i.e., entire molecules of CdS, CdSe and CdTe interchange positions in the lattice structure.

The mutual diffusion phenomenon has been observed occurring at all temperatures elevated above normal ambient room temperatures. It has been observed that the length of time necessary for complete mutual diffusion in a dry state to occur of two cadmium salt crystals will be doubled for approximately each ten degrees centigrade decrease in heating temperature from 400° C. Thus about 300° C. represents the lowest practical limit as a heating temperature since it then takes weeks for small crystals and months for larger crystals to mutually diffuse in substantial amounts in a dry state. There is really no theoretical lower temperature limit at which the diffusion phenomenon will occur but the diffusion process takes place at such a slow rate at temperatures below 300° C. that for all practical purposes heating must be done at temperatures above 300° C.

The relative sizes of the crystals which are mutually diffused have a material bearing on the length of time heating must be continued. Since smaller crystals mutually diffuse faster, the crystals are granulated or pulverized prior to being placed in contact with each other. When the diffusion process is performed with larger crystal masses, it is generally done at a higher temperature to accomplish diffusion in a minimum time.

When a crystal of two different cadmium salts is heated below sintering temperature in contact with each other in a dry, solid state they do not fuse together so that just one crystal results. Instead respective mutual diffusion occurs so that the crystal of one cadmium salt acquires molecules of the other cadmium salt crystal and vice versa. When heating is sufficiently prolonged mutual diffusion becomes complete in both crystals and the two individual crystals then have the same molecular content and crystalline structure.

The invention thus described above has provided a means and method for obtaining a photocell having a prescribed spectral-response characteristic and response peak. It has further made it possible to obtain a photocell having a prescribed temperature-response characteristic and more particularly to obtain a photosensitive photoconductive element having a substantially zero temperature coefficient of response over a predetermined temperature range. The invention has provided a means to obtain photocells having predetermined characteristics independent of the activity or method of activation of the photosensitive elements. The invention has provided a method and means to obtain photosensitive elements having the characteristics described in the form of individual crystals, diffusions of individual polycrystalline masses, and granular crystalline diffusions dispersed in film forming binders.

This application is a continuation-in-part of my application Serial No. 644,340, filed March 6, 1957, now abandoned.

What is claimed is:

1. A photosensitive element having an electrical conductivity responsive to incident light, comprising a solid crystalline mass composed of cadmium sulphide and cadmium selenide diffused into each other, said mass having a diffusion gradient varying progressively from one portion of the mass to another.

2. A photosensitive element comprising a support, and a layer of granular crystalline diffusions dispersed in a binder on said support, said diffusions consisting of individual crystals of cadmium sulphide and cadmium selenide partially diffused into each other, and an activator incorporated in said layer to increase the photosensitivity thereof.

3. A photoconductive cell comprising a polycrystalline mass composed of cadmium sulphide crystals partially diffused into cadmium selenide crystals and cadmium selenide crystals partially diffused into cadmium sulphide crystals, said mass being disposed on a support, and a pair of spaced electrodes disposed in contact with said mass.

4. A photoconductive cell comprising a body composed of solid crystalline masses dispersed in a solid transparent binder, said masses being composed of crystals of cadmium sulphide and crystals of cadmium selenide mutually and partially diffused into each other, and a pair of spaced electrodes disposed in contact with said body.

5. A photoconductive cell comprising a polycrystalline mass composed of crystals of cadmium sulphide and crystals of cadmium selenide partially diffused into each other, an activator embodied in said mass, and a pair of spaced electrodes disposed in contact with said mass.

6. A photosensitive element having an electrical conductivity responsive to incident light, comprising a single crystal containing crystalline cadmium sulphide and crystalline cadmium selenide partially diffused into each other, and an activator embodied in the crystal for increasing the photosensitivity of the crystal to incident light.

7. A photosensitive element having an electrical conductivity responsive to incident light, comprising a solid polycrystalline mass composed of granular crystals of cadmium sulphide and granular crystals of cadmium sulphide diffused partially into each other so that the conductivity of the crystalline mass responds to a broader range of wavelengths of incident light than the spectral response range of individual crystals of cadmium sulphide and cadmium selenide taken alone and an activator incorporated in said mass to increase the photosensitivity of mass to incident light.

8. A method of forming photosensitive elements having electrical conductivities responsive to a broader range of wavelengths of incident light than the spectral response of individual crystals of cadmium sulphide, cadmium selenide taken alone, comprising the steps of heating a solid crystal of cadmium sulphide in surface contact with a solid crystal of cadmium selenide until the crystals mutually and partially diffuse into each other to produce two partial crystalline diffusions, and incorporating an activator into the diffusions to increase the photosensitivity of the crystalline diffusions to incident light.

9. A method of forming a photoconductive element, comprising the steps of forming a slurry of a mixture of granular crystals of cadmium sulphide and granular crystals of cadmium selenide, depositing the slurry on a support, draining, settling and drying the slurry at room temperature, heating the dried slurry until the individual crystals of cadmium sulphide and crystals of cadmium selenide partially diffuse into each other, and incorporating an activator into the heated partially diffused crystals, to produce a polycrystalline layer on said support having an electrical conductivity responsive to a broader range of wavelengths of incident light than the spectral response of undiffused crystals of cadmium sulphide and cadmium selenide.

10. A photosensitive element comprising an inert support, a first wedge of photoconductive material disposed on said support, and another wedge of another photoconductive material disposed on the first wedge, said wedges being disposed with the apical end of the first wedge adjacent the base end of the other wedge and vice versa so that the two wedges form a rectangular block on said support.

11. A photosensitive element comprising an inert support, said support having a tapered general wedge shape, a wedge of a photoconductive material disposed on said support and a thin flat layer of another photoconductive material disposed on said wedge.

12. A photosensitive element comprising an inert support, a first wedge of photoconductive material disposed on said support, another wedge of a second photoconductive material disposed on the first wedge, and an inverted pyramid of a third photoconductive material disposed on the first and second wedges.

13. A photosensitive element, consisting of crystals of cadmium sulphide, cadmium selenide, and cadmium telluride mutually diffused into each other.

References Cited in the file of this patent

UNITED STATES PATENTS

| | | |
|---|---|---|
| 2,496,901 | Van Hoorn | Feb. 7, 1950 |
| 2,706,792 | Jacobs | Apr. 19, 1955 |
| 2,736,848 | Rose | Feb. 28, 1956 |
| 2,765,385 | Thomsen | Oct. 2, 1956 |
| 2,839,645 | Hester | June 17, 1958 |